US007127526B1

(12) United States Patent
Duncan et al.

(10) Patent No.: US 7,127,526 B1
(45) Date of Patent: Oct. 24, 2006

(54) METHOD AND APPARATUS FOR DYNAMICALLY LOADING AND MANAGING SOFTWARE SERVICES ON A NETWORK DEVICE

(75) Inventors: Robert J. Duncan, San Francisco, CA (US); Tal I. Lavian, Sunnyvale, CA (US)

(73) Assignee: Nortel Networks Limited (CA)

( * ) Notice: Subject to any disclaimer, the term of this patent is extended or adjusted under 35 U.S.C. 154(b) by 586 days.

(21) Appl. No.: 09/709,830

(22) Filed: Nov. 9, 2000

Related U.S. Application Data

(60) Provisional application No. 60/190,729, filed on Mar. 20, 2000.

(51) Int. Cl.
*G06F 15/16* (2006.01)
(52) U.S. Cl. ...................................... 709/249; 709/316
(58) Field of Classification Search ........ 709/220–226, 709/246, 228, 249, 238, 250, 299, 104, 203, 709/245, 219, 234, 240; 705/26, 14; 717/11, 717/178, 174, 171, 173; 380/277; 345/709, 345/763, 522; 718/104; 370/401, 352, 236, 370/489, 255, 260, 409; 719/316; 704/277; 340/825; 710/1; 715/745; 711/113
See application file for complete search history.

(56) References Cited

U.S. PATENT DOCUMENTS

| | | | | |
|---|---|---|---|---|
| 5,058,108 A | * | 10/1991 | Mann et al. ................. | 370/409 |
| 5,440,740 A | * | 8/1995 | Chen et al. .................. | 718/104 |
| 5,483,654 A | * | 1/1996 | Staron et al. ................ | 345/763 |
| 5,550,984 A | * | 8/1996 | Gelb .......................... | 709/245 |
| 5,561,752 A | * | 10/1996 | Jevans ......................... | 345/522 |
| 5,604,914 A | * | 2/1997 | Kabe ............................. | 710/1 |
| 5,640,530 A | * | 6/1997 | Beardsley et al. .......... | 711/113 |
| 5,678,002 A | * | 10/1997 | Fawcett et al. ............. | 345/709 |
| 5,809,145 A | * | 9/1998 | Slik et al. ...................... | 705/52 |
| 5,892,824 A | * | 4/1999 | Beatson et al. ............. | 713/186 |
| 5,954,797 A | * | 9/1999 | Sidey .......................... | 709/223 |
| 6,009,274 A | * | 12/1999 | Fletcher et al. ............. | 717/173 |
| 6,049,671 A | * | 4/2000 | Slivka et al. ................ | 717/173 |
| 6,055,512 A | * | 4/2000 | Dean et al. ................... | 705/17 |
| 6,081,513 A | * | 6/2000 | Roy ............................ | 370/260 |
| 6,085,030 A | * | 7/2000 | Whitehead et al. ......... | 709/203 |
| 6,092,107 A | * | 7/2000 | Eleftheriadis et al. ...... | 709/217 |

(Continued)

OTHER PUBLICATIONS

An implementation of customizable services with Java/ORB integration Tomono, M.; Yamanaka, A.; Tonouchi, T.; Nakajima S.; Global Telecommunications Conference, 1997. GLOBECOM '97., IEEE , vol. 3, Nov. 3-8, 1997.*

(Continued)

*Primary Examiner*—Thong Vu
(74) *Attorney, Agent, or Firm*—McGuinness & Manaras LLP

(57) ABSTRACT

The present invention relates to an apparatus and method for dynamically loading and managing software services on a network device. A service environment ported to the network device includes a service environment kernel and a virtual machine. The service environment kernel continually operates on the network device and manages the downloading of services from a remote location onto the network device. In accordance with a request from a remote client such as a network manager, the service environment kernel causes instructions corresponding to the downloaded service to be provided to the virtual machine for execution on the network device. Associated with the service are service relationships. The service environment kernel manages these relationships by maintaining a registry of services and their dependencies on other services. The service environment kernel also controls the execution of services in accordance with the service relationships.

44 Claims, 5 Drawing Sheets

U.S. PATENT DOCUMENTS

| | | | | |
|---|---|---|---|---|
| 6,098,089 | A * | 8/2000 | O'Connor et al. | 718/104 |
| 6,195,432 | B1 * | 2/2001 | Takahashi et al. | 380/277 |
| 6,199,204 | B1 * | 3/2001 | Donohue | 717/178 |
| 6,226,692 | B1 * | 5/2001 | Miloushev et al. | 719/316 |
| 6,233,611 | B1 * | 5/2001 | Ludtke et al. | 709/223 |
| 6,256,393 | B1 * | 7/2001 | Safadi et al. | 380/232 |
| 6,308,206 | B1 * | 10/2001 | Singh | 709/223 |
| 6,308,326 | B1 * | 10/2001 | Murphy et al. | 717/174 |
| 6,314,565 | B1 * | 11/2001 | Kenner et al. | 717/171 |
| 6,347,398 | B1 * | 2/2002 | Parthasarathy et al. | 717/178 |
| 6,363,421 | B1 * | 3/2002 | Barker et al. | 709/223 |
| 6,370,573 | B1 * | 4/2002 | Bowman-Amuah | 709/223 |
| 6,385,175 | B1 * | 5/2002 | Dove | 370/255 |
| 6,411,995 | B1 * | 6/2002 | Gebauer | 709/219 |
| 6,442,620 | B1 * | 8/2002 | Thatte et al. | 719/316 |
| 6,487,170 | B1 * | 11/2002 | Chen et al. | 370/231 |
| 6,496,802 | B1 * | 12/2002 | van Zoest et al. | 705/14 |
| 6,510,513 | B1 * | 1/2003 | Danieli | 713/156 |
| 6,560,656 | B1 * | 5/2003 | O'Sullivan et al. | 709/250 |
| 6,563,793 | B1 * | 5/2003 | Golden et al. | 370/236 |
| 6,604,140 | B1 * | 8/2003 | Beck et al. | 709/226 |
| 6,633,848 | B1 * | 10/2003 | Johnson et al. | 704/277 |
| 6,754,219 | B1 * | 6/2004 | Cain et al. | 370/401 |
| 6,757,729 | B1 * | 6/2004 | Devarakonda et al. | 709/226 |
| 6,766,301 | B1 * | 7/2004 | Daniel et al. | 705/14 |
| 6,771,290 | B1 * | 8/2004 | Hoyle | 715/745 |
| 6,779,030 | B1 * | 8/2004 | Dugan et al. | 709/223 |
| 6,789,126 | B1 * | 9/2004 | Saulpaugh et al. | 709/245 |
| 6,810,427 | B1 * | 10/2004 | Cain et al. | 709/238 |
| 6,842,901 | B1 * | 1/2005 | Miller | 718/104 |
| 6,845,393 | B1 * | 1/2005 | Murphy et al. | 709/220 |
| 6,865,178 | B1 * | 3/2005 | Eugel et al. | 370/352 |
| 7,003,495 | B1 * | 2/2006 | Burger et al. | 705/50 |
| 7,062,461 | B1 * | 6/2006 | Ausubel | 705/37 |
| 2001/0025260 | A1 * | 9/2001 | Blumofe | 705/27 |
| 2003/0131252 | A1 * | 7/2003 | Barton | 713/193 |
| 2005/0038903 | A1 * | 2/2005 | Venemans | 709/234 |
| 2006/0025206 | A1 * | 2/2006 | Walker et al. | 463/20 |

OTHER PUBLICATIONS

Dynamic Class Loading in the Java Virtual Machine—Liang, Bracha (1998) ; java.sun.com/people/gbracha/classloaders.ps.*

OS Support for General-Purpose Routers—Peterson, Karlin, Li (1999); www.cs.princeton.edu/nsg/papers/hotos99.ps.*

Dynamic Agents—Chen, Chundi, Dayal, Hsu (1999) ; www.hpl.hp.com/org/stl/dmsd/publications/agent_j.pdf.*

The MetaCrawler Architecture for Resource Aggregation on the Web—Selberg, Etzioni (1997); www.cs.washington.edu/homes/speed/papers/ieee/ieee-metacrawler.ps.*

The State of Service Protocols—Moorman, Lockwood, Kang (2000) ; iwander.vlsi.uiuc.edu/wireless/papers/network00.ps.*

An Application of Mobile Agents as Personal Assistents ..—Roth, Jalali.. (2000) ; www.igd.fhg.de/~vroth/papers/vroth00a_paam.pdf.*

The Simple Times, vol. 7, No. 1, Mar. 1999; www.simple-times.org/pub/simple-times/issues/7-1.html.* browsers.webhack.com/mozilla/m13/m13-detail.html.* www.ieff.org/rfc/rfc2593.txt; www.ietf.org/rfc/rfc2593.txt.*

An Architecture for a Secure Service Discovery Service—Czerwinski, Zhao, Hodes.. (1999) daedalus.cs.berkeley.edu/publications/sds-mobicom99.ps.gz.*

An Architecture for Next Generation Middleware—Blair, Coulson, Robin.. (1998) ftp.comp.lancs.ac.uk/pub/mpg/MPG-98-27,ps.Z.*

PLANet: An Active Internetwork—Michael Hicks (1999) www.cs.wisc.edu/~cs640-1/papers/planet-act-net.ps.*

Hive: Distributed Agents for Networking Things—Minar, Gray, Roup, Krikorian.. (1999) nelson.www.media.mit.edu/people/nelson/research/hive-asama99/hive-asama99.ps.gz.*

* cited by examiner

METHOD AND APPARATUS FOR DYNAMICALLY LOADING AND MANAGING SOFTWARE SERVICES ON A NETWORK DEVICE

CROSS-REFERENCE TO RELATED APPLICATIONS

The present application is based on, and claims priority from, U.S. Provisional Appln. No. 60/190,729, filed Mar. 20, 2000.

FIELD OF THE INVENTION

The present invention relates to network device configuration and monitoring, and more particularly, to a method and apparatus for dynamically loading and managing software services on an embedded device.

BACKGROUND OF THE INVENTION

Computer networks continue to proliferate. As they do so, they become increasingly complex and difficult to manage. This problem is exacerbated when a variety of network devices, computers, and software are combined together to integrate large intranets with the Internet.

As shown in FIG. 1, a conventional network 100 includes one or more network devices 102 such as switches, routers, hubs, multiplexers and similar devices capable of processing fixed-length or variable-length packets in a network. Network devices 102 may further communicate with hosts 104 via a local area network, for example. Network manager 106 also communicates with network devices 102 via the network 100.

To manage the network 100, network manager 106 generally polls network devices 102 using protocols such as SNMP to access information in the device's management information base (MIB). The manager 106 thus needs to know all the MIBs supported by each device, which is especially problematic if the network includes devices of various different types or from various different manufacturers. Further, polling requires that the network manager send many messages of the same type to each device and continually over a period of time. This floods the network and can downgrade the network's performance, as well as burdening the network manager 106 with highly repetitive and duplicative tasks.

Moreover, the forwarding and control capabilities of conventional network device 102 are also statically constrained by the routing software and control software preloaded on the device 102. Although many conventional devices include means for effecting software updates (for example, by downloading software via FTP), such updates must be carefully performed and monitored for each device in the network, usually manually by the network manager 106. Such updates require much manager intervention, are risky to perform, require de-commissioning the device during updating, and require a period of verification after updating, thus making network management and performance even more problematic. Further, although some updates may only affect certain individual modules, generally the whole code has to be swapped out to install the updated modules, rather than just the updated modules themselves.

SUMMARY OF THE INVENTION

The present invention relates to an apparatus and method for dynamically loading and managing software services on a network device. A service environment ported to the network device includes a service environment kernel and a virtual machine. The service environment kernel continually operates on the network device and manages the downloading of services from a remote location onto the network device. In accordance with a request from a remote client such as a network manager, the service environment kernel causes instructions corresponding to the downloaded service to be provided to the virtual machine for execution on the network device. Associated with the service are service relationships. The service environment kernel manages these relationships by maintaining a registry of services and their dependencies on other services. The service environment kernel also controls the execution of services in accordance with the service relationships so as to guarantee the modular and effective alteration of the behavior of the network device.

In accordance with one aspect of the invention, a method for performing a service on a network device, comprising the steps of installing the service on the network device from another location, the service having a corresponding set of service relationships, checking the service relationships of the loaded service against a stored registry of relationships, and causing the service to be executed on the network device if the service relationships can be resolved.

In accordance with another aspect of the invention, a network device for locally performing a service, comprises means for installing the service on the network device from another location, the service having a corresponding set of service relationships, means for checking the service relationships of the loaded service against a stored registry of relationships, and means for causing the service to be executed on the network device if the service relationships can be resolved.

In accordance with another aspect of the invention, a network device for locally performing a service, comprises a network interface adapted to install the service on the network device from another location, the service having a corresponding set of service relationships, a registry of service relationships, a service manager coupled to the network interface and the registry that is adapted to check the service relationships of the loaded service against the registry, and a service launcher coupled to the service manager that is adapted to cause the service to be executed on the network device if the service relationships can be resolved.

BRIEF DESCRIPTION OF THE DRAWINGS

The foregoing and other features, aspects, and advantages of the present invention will become more apparent from the following detailed description when read in conjunction with the following drawings, wherein.

DETAILED DESCRIPTION OF THE PREFERRED EMBODIMENTS

The present invention will now be described in detail with reference to the accompanying drawings, which are provided as illustrative examples of preferred embodiments of the present invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
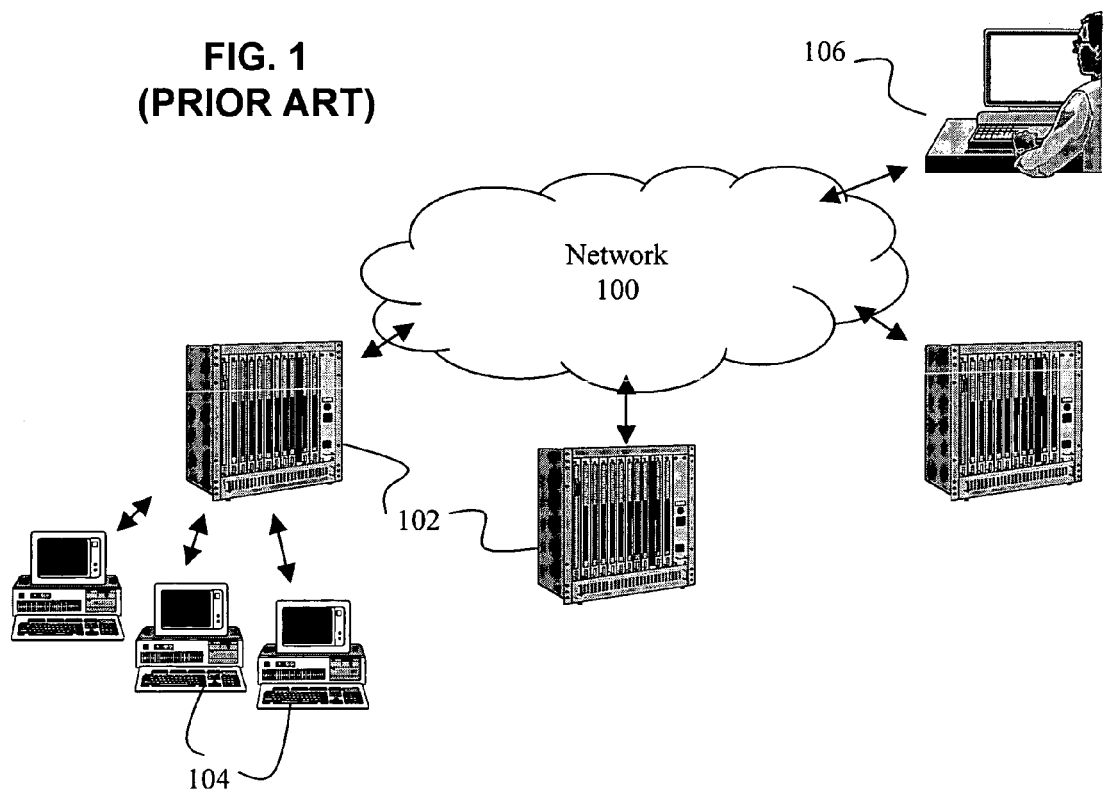
FIG. 1 is a block diagram illustrating how network devices are managed in a conventional network.
Figure 2:
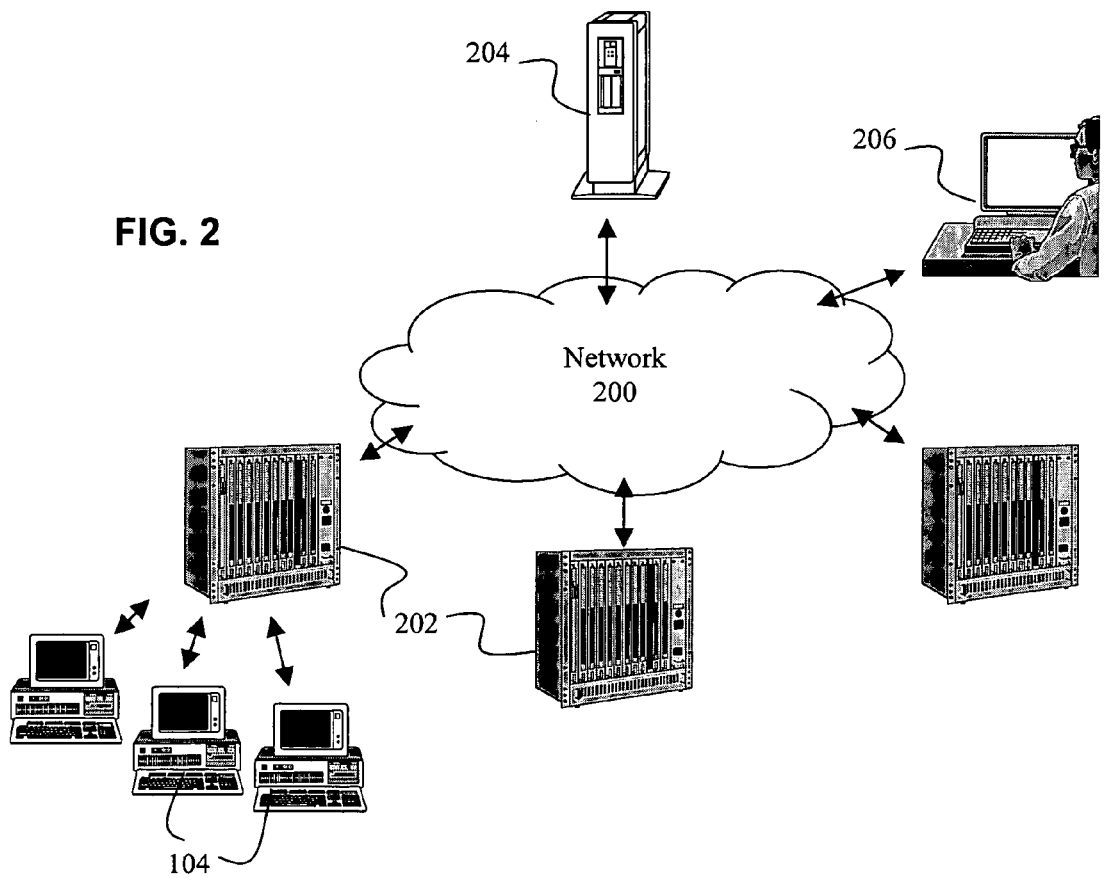
FIG. 2 is a block diagram illustrating how network devices are managed in a network in accordance with an embodiment of the present invention.

FIG. 2 illustrates an example of a network 200 configured in accordance with an embodiment of the present invention.

As shown in FIG. 2, network devices 202 communicate with an application server 204 and network manager 206. As in the conventional network 100, network devices 202 may further communicate with hosts 104 via a local area network, for example.

Generally, the present invention allows for the downloading of services from application server 204 that can be dynamically executed on network devices 202, either automatically or under the direction of manager 206. Such services enhance the functionality of conventional network devices 102 and can include traffic monitoring and performance guarantees (e.g. QOS, uniform latency), intrusion detection, active networking, accounting and billing, closed-loop feedback, error detection, diagnosis, and remediation. Such services can further alter the functionality in the network device to make it available for use in ways previously unavailable, such as turning a router into a load balancing switch, turning a network database into a web server, and adding proxy, load balancing, caching, better security (e.g. VPN), bandwidth allocation, VoIP and unified communications support to ordinary network devices. It should be apparent that even further capabilities and applications of the present invention are possible, such as mobile agents, e-market supply chains and distributed processing applications.

Although only one application server 204 and network manager 206 are shown, it should be noted that there can be several of each, or the server 204 functionality can be provided together with another network component or combined with the functionality of manager 306, or perhaps not included in the same network. Alternatively, a server 204 may actually be another network device 202 that has been enhanced with server capabilities with dynamic services in accordance with the present invention. Many other alternatives are possible, and such should become apparent after those skilled in the art are taught by the present disclosure.

An advantage of the network 202 configured in accordance with the invention is that network management services can be performed on the network devices themselves, thus freeing the network manager 206 of duplicative and repetitive tasks, and reducing the number of network management messages that may need to be communicated across the network. For example, a network management service downloaded to a network device 202 may cause the network device 202 to periodically report on a device variable relating to network traffic. Thus, instead of network manager 206 having to periodically send a report request message to each device 202, network manager 206 simply once causes the service to be executed on the network devices of interest, and then receives all the responses at the desired periods. Many other alternative network management services and advantages are possible and should become apparent to those skilled in the art after being taught by the present disclosure.

Figure 3:
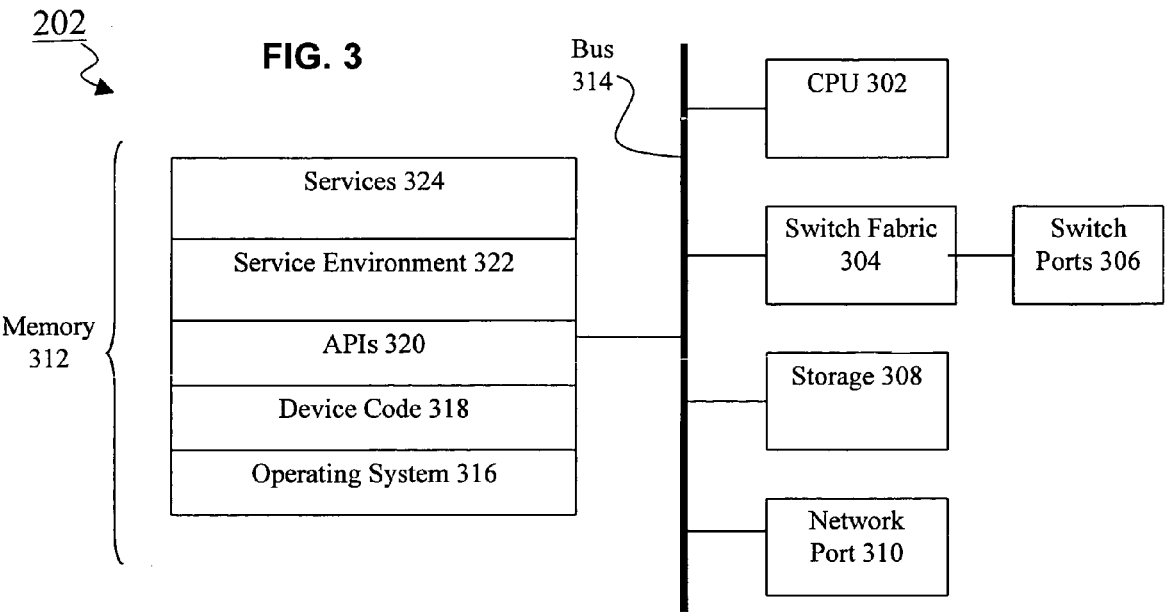
FIG. 3 is a structural block diagram illustrating an example of a network device in accordance with an embodiment of the present invention.

FIG. 3 further is a structural block diagram illustrating an example of a network device 202 in accordance with an embodiment of the present invention.

As shown, network device 202 includes a CPU 302, switch fabric 304, storage 308, network port 310 and memory 312 all communicating via a bus 314. Switch fabric 304 further communicates with switch ports 306, which ports are capable of communicating packets with a network using network protocols such as TCP/IP and Novell Netware, for example. Storage 308 can comprise memory for storing program and device data and can comprise a variety of storage media such as RAM, ROM, flash memory, and magnetic or optical storage media. Network port 310 can provide a loopback address for access by services and other network management applications. During operation of network device 302, memory 312 includes code for execution by CPU 310 such as an operating system 316, device code 318, APIs 320, service environment 322 and services 324. This example network device architecture is intended to be illustrative rather than limiting, and it should be apparent that additional or fewer components can be included in a network device while remaining within the spirit of the present invention.

In accordance with the present invention, service environment 322 provides an execution platform through which services 324 are performed using CPU 302. Service environment 322 also facilitates the downloading from application server 204 and installation onto device 202 of services 324 and manages their execution on CPU 302. Network manager 206 can communicate with device 202 to request device 202 to execute one or more of the services 324.

It should be noted that components corresponding to CPU 302, switch fabric 304, switch ports 306, storage 308, network port 310, memory 312 (including operating system 316, device code 318 and possibly some of APIs 318) and bus 314 may also be provided in a conventional network device 102, or are otherwise well understood by those skilled in the art. Accordingly, such elements will not be described here in detail so as not to obscure the invention. Moreover, as should be further apparent from FIG. 3, adapting a conventional network device 102 in accordance with the invention may merely require updating memory 312 to include executable software having functionality corresponding to the services 324 and service environment 322 of the invention (possibly as well as some of APIs 504) as will be described in more detail below.

It should be further noted that, although an implementation of the present invention in network devices 202 including a switch fabric (e.g., switches, routers and hubs) is considered particularly advantageous, other implementations of the present invention are possible. Generally, a network device 202 in accordance with the invention can be considered as any device stationed on the network having an embedded processor. Accordingly, such devices may further include database servers, video servers, wireless access points, firewalls, load balancing switches for a farm of routers, access routers, etc. A useful application includes the provision of the functionalities of the present invention in network devices 202 that are located at "impedance mismatch" points in the network where network management is a special concern and where frequent, short-lived adjustment to the behavior of the device is desired.

Figure 4:
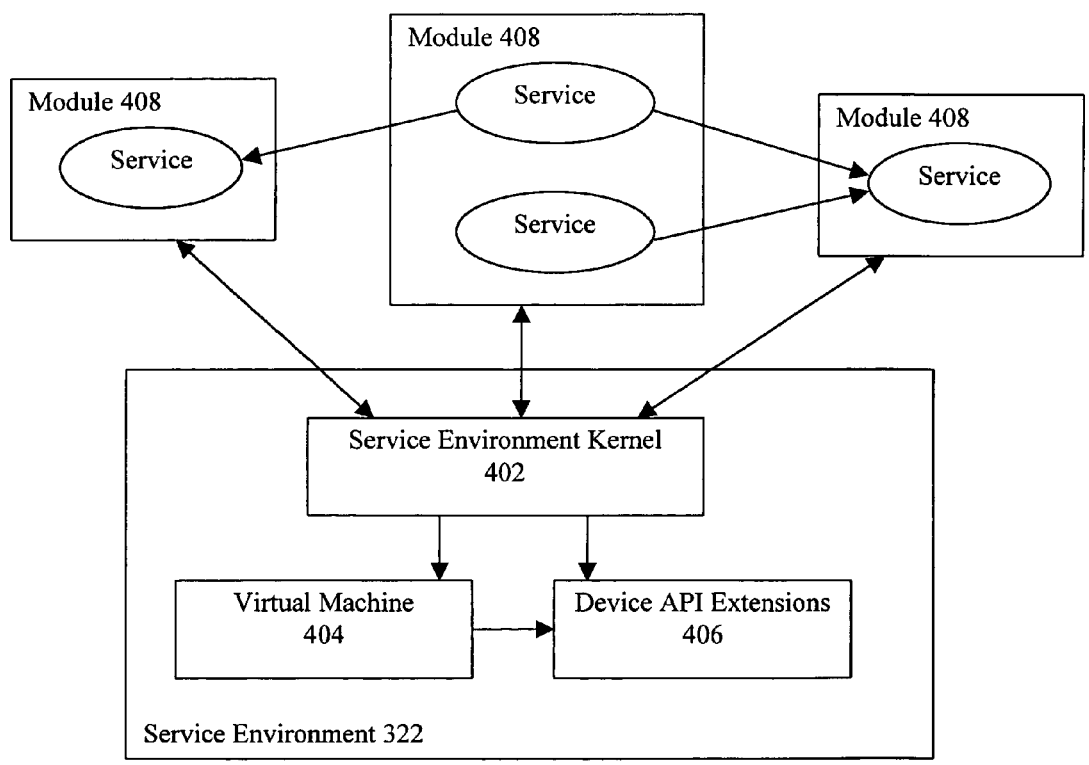
FIG. 4 is a functional block diagram illustrating an example of a service environment in a network device such as that illustrated in FIG. 3 in accordance with an embodiment of the present invention.

FIG. 4 illustrates an example of a service environment 322 in accordance with an embodiment of the present invention.

As shown in FIG. 4, service environment 322 includes a service environment kernel 402, a Virtual Machine (VM) 404 and device API extensions 406. Service environment kernel 402 will be described in more detail below. Although the implementation of VM 404 and device API extensions 406 depends on the capabilities and functionalities of device 202, it is intended that they commonly provide a platform-independent interface so that code comprising service environment kernel 402 and services 324 can execute on any device 202. In one example of the invention, VM 404 includes a Java Virtual Machine (JVM) and the Java foundation classes. The Java Virtual Machine is one type of virtual machine that provides for platform independent computing using the Java programming language. Those skilled in the art will understand how to implement JVM 404 depending on the network device CPU 302, operating system 316 and device-level code 318, because JVMs are, by their nature, intended to be portable to different executing platforms.

It should be further noted that device API extensions 406 may or may not be necessary depending on the existing APIs of the device and the types of services 324 that are desired to be executed on the device. For example, where the device 202 includes a standard MIB interface, and a downloaded service 324 includes functionality for getting and reporting on MIB variables, a device API extension 406 may be provided on the device for interoperating with the device code 318 that implements the MIB interface and for providing a standard programming interface for programs written in the language of service 324. Device API extensions 406 are shown here so that those skilled in the art will understand how to practice the invention, though illustrations and details of particular API extensions are not necessary to understand the invention.

In operation, the service environment kernel 402 and VM 404 are preferably launched as part of the device's boot image. One or more services 324 may be launched automatically by service environment 322, or certain services 324 may be launched only upon request from a network manager. Apart from the functionalities illustrated in FIG. 4, service environment 322 may include some device-specific code that enables the service environment to be executed as a task under the device's existing operating system and to launch the VM and service environment kernel. In such an example, service environment 322 can comprise a single executable with linked modules 402, 404 and 406, along with some housekeeping code.

As should be apparent from the above, in the example of the invention wherein VM 404 includes a Java Virtual Machine, services 406 are written in the Java programming language. However, the invention is not limited to this example and those skilled in the art will understand how to implement the invention using other programming languages. Generally, service environment kernel 402 receives service module code in object form and presents it to the VM for incorporation into the runtime environment of the device. In the Java programming example, service environment kernel 402 receives Java byte codes from services 324 and provides them to run on the Java VM 404.

As further shown in FIG. 4, service environment kernel 322 interoperates with services 324, which may further interoperate with each other. As shown, a service module 408 may include one or more of services 324. The service environment 322 preferably provides a registry so that services can locate one another. When a service is started it is added to a registry, and when it is stopped it is removed from the registry. When a service uses another service, a dependency exists between the service module and the other service. The service environment 322 manages these dependencies and ensures that they are satisfied. If dependencies cannot be satisfied, the dependent service cannot be started. If a running service depends on a service that is stopped, the dependent service must also be stopped.

The following describes an example implementation of services 324 in accordance with this example of the invention using the Java programming language.

In one example of the invention, services 324 are grouped in one or more service modules 408 which are packaged in Java Archive (JAR) files. The JAR file contains the classes that implement the services 324 and any auxiliary resources that they require, such as data files and images. The JAR file can also contain subsidiary JAR files to help organize these resources. The JAR manifest contains signature information that is used to authenticate the JAR and verify its integrity as part of the service environment's security mechanism. Additional service environment-specific information is placed in the JAR manifest to represent meta-data such as the dependencies the JAR has, and declarations for the services that it provides.

Once the services are packaged, the JAR file corresponding to service module 408 can be downloaded across the network from a server such as server 204 to the network device 202 hosting the service environment.

A service module in accordance with the invention is declared by providing a service module header in the manifest. This header gives the fully qualified name of a class in the JAR file that implements a standard interface. The service environment 322 can use this class to discover dependencies the service module has on other services, manage the lifecycle of the service module, discover any auxiliary resources and check version information.

Below is an example of the manifest headers for a simple service module based on the standard interface:

Module: mypackage.MyModule
Services: mypackage.MyService(implemtationID)
Dependencies: otherpackage.OtherService This declares that the service module contains the standard interface class with the fully qualified name mypackage.MyModule which provides a service with the fully qualified name mypackage.MyService. In addition, this service module uses facilities from the otherpackage.OtherService service provided by another service module. This means that this service module has a dependency on other-package.OtherService.

Below is an example of a standard interface in accordance with an embodiment of the present invention.

```
public interface Service
{
    /** Performs any service-specific operations when the service is
     * installed. This method is called before the service is fully
     * resolved. This means that it can make use of any classes and
     * resources that are in the service itself, but it must not use any
     * of the services from other services that it depends upon. Simply
     * declaring a variable with a type provided by another service
     * constitutes a use of the service.
     *
     * @param context the service that is being installed
     * @exception ServiceException if the service cannot be installed
     */
    void install(ServiceContext context) throws ServiceException;
    /** Performs any service-specific operations when the service is
     * started. The service's dependencies are resolved before this
     * method is called, so it can use classes and services provided
     * by services from other services.
     *
     * @param context the service that is being started
     * @exception ServiceException if the service cannot be started
     */
    void start(ServiceContext context) throws ServiceException;
    /** Performs any service-specific operations when the service is
     * stopped. The service's dependencies are resolved before this
     * method is called, so it can use classes and services provided
     * by services from other services. The service's dependencies are
     * set to the unresolved state after this method returns.
     *
     * @param context the service that is being started
     * @exception ServiceException if the service cannot be started
     */
    void stop(ServiceContext context) throws ServiceException;
    /** Performs any service-specific operations when the service is
     * uninstalled. This method is called after the service is stopped
     * (if it had been started), and before any of the service's
     * resources are removed. The service's dependencies are not
     * resolved when this method is called, so it cannot make use of
     * classes and services provided by services from other services.
     *
     * @param context the service being uninstalled
     * @exception ServiceException if an error occurs during execution
     */
    void uninstall(ServiceContext context) throws ServiceException;
    /** Gets an array of all the services that the service is declared
     * to depend on. The service environment uses this information to
     * resolve dependencies before starting the service.
     *
     * @param context the service
     * @return the services that the service depends upon;
     *<code>null</code> if the service doesn't depend on any
     */
    ServiceDescription[ ] getRequiredServices(ServiceContext context);
    /** Gets an array of all of the JAR files that the service has
     * declared a dependency on. These JAR files are added to the
     * service's class path. If a specified JAR file cannot be found in
     * the service's underlying JAR file, it is is silently ignored.
     * This method returns <code>null</code> if there are no JAR file
     * dependencies. The service environment uses this information to
     * resolve dependencies before starting the service.
     *
     * @param context the service
     * @return the names of the JAR files; or <code>null</code> if
     * there are no JAR file dependencies
     */
    String[ ] getJarFiles(ServiceContext context);
    /** Gets information about this service.
     *
     * @param context the service
     */
    ServiceInfo getServiceInfo(ServiceContext context);
    /** Gets information about a service provided by this service.
     *
     * @param context the service
     **/
    ServiceInfo getServiceInfo(ServiceContext context, ServiceDescription desc);
```

In one example of the invention, in addition to service-specific code, services 324 include code that declares an interface which extends or implements a standard defined interface class for all services, and provides an object that implements that interface. The service module preferably further includes code which defines how the services are started and stopped (e.g. start and stop methods, which may be part of the standard interface as shown above). After the service is started, it is added to a registry maintained by the service environment, and before it stops it is unregistered. Services can export their functionality to other service modules running on the network device, and they can also make use of services provided by other service modules.

Services are identified with a service description. As shown above, these descriptions (e.g. mypackage.MyService(implementationID)) are comprised of two parts: the fully qualified name of the interface that declares the service (e.g. mypackage.MyService) and a service-specific name that lets a client such as network manager 206 distinguish between multiple implementations of the service (e.g. implementationID). For example, a service module that provides logging services might declare an interface myUtils.MyLogger, and then provide one implementation that writes the log to local persistent storage, and another implementation that transmits the log messages across the network to a server. In this case, the service module provides two different service objects that implement that myUtils.MyLogger interface. These objects would be registered using different service descriptions. Both service descriptions would use the myUtils.MyLogger interface name, but they would have different service-specific names (e.g. myUtils.MyLogger (local) and myUtils.MyLogger(remote)).

There is no requirement that the service module that provides the service interface be the only one that can provide an implementation of it. Two service modules may both register an implementation of a service, each with different service-specific names. For this to be possible, the service module that does not contain the interface definition declares a dependency on that service.

Figure 5:
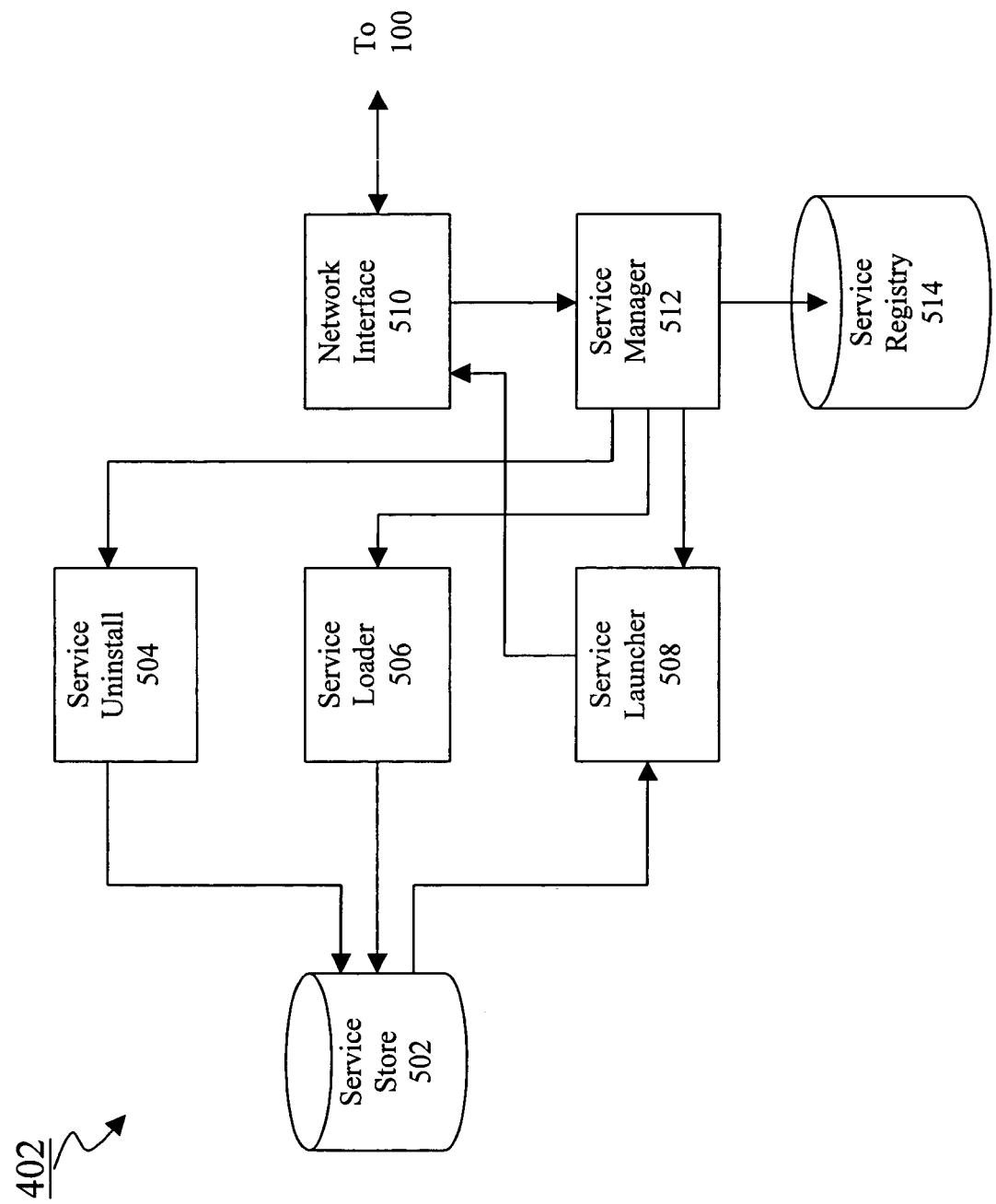
FIG. 5 is a functional block diagram illustrating an example of a service environment kernel that can be included in a service environment such as that illustrated in FIG. 4 in accordance with an embodiment of the present invention.

FIG. 5 further illustrates an example of a service environment kernel 402 in accordance with an embodiment of the present invention.

As shown in FIG. 5, service environment kernel 402 includes a service store 502, a service uninstaller 504, a service installer 506, a service launcher 508, a network interface 510, a service manager 512 and a service registry 514. The division of functionalities among these blocks is intended to be illustrative rather than limiting. It should be apparent that these functionalities may be grouped and divided in various alternative implementations while remaining within the spirit of the invention. Moreover, there exist other alternative embodiments that may include more or less functionality than described in this example, and such alternative embodiments are also within the scope of the invention.

Generally, in operation, service manager 512 sends and responds to messages from the network through network interface 510 and coordinates the downloading, management and execution of services via service installer 506, service launcher 508 and service uninstaller 504, in the process managing the contents of service registry 514. In one example of the invention, services 324, service manager 512, network interface 510, service installer 506, service launcher 508 and service uninstaller 504 are implemented using the Java programming language. Accordingly, execution of the functionalities of these elements involves providing instructions to the Java VM 404 and interfacing with API extensions 406, with both the Java VM 404 and extensions 406 being written in the native programming language. In this way, the service environment kernel 402 of the present invention can be made portable to any network device platform to which can be ported a Java VM, thus dramatically enhancing network management capabilities, particularly in networks comprising disparate types of network devices.

In one example of the invention, service environment 322 is a single executable that is launched as a task under the device operating system when the device 202 is booted, including service environment kernel 402, Virtual Machine 404 and Device API extensions 406. The service manager 512 is the main procedure of the service environment kernel 402 and calls the other procedures in the service environment 322, as well as the other modules in the service environment kernel 402. Service manager 512 first executes a start sequence that initializes the set of services operating on the device 202. Network interface 510 and certain of the other modules in kernel 402 can be implemented as part of the initial services included in the initial set. Further, the start sequence may also be a service itself that is located in service store 502 or on another device such as application server 204.

The start sequence may specify a list of the URLs corresponding to other initial service modules that should be installed and started on the device at boot time (including network interface 510 and other modules in kernel 402). Such initial services can further include basic services that can be called by other services such as logging services. The URLs may specify JAR files corresponding to service modules that are located on the device 202, or they may be located on application server 204. For those URLs referring to JAR files on server 204, service manager 512 may interoperate with network interface 510 and service installer 506 to retrieve, download and store the service modules encapsulated in those JAR files.

As service modules are loaded and installed on the device 202, service manager 512 updates the service registry 514. Thereafter, as additional service modules are downloaded, executed or uninstalled, either by operation of service manager 512, or in response to other network elements such as network manager 206, service manager 512 manages the operations of service installer 506, service launcher 508 and service uninstaller 504 to perform such downloading, execution or uninstallation, in accordance with service relationships defined in the service registry 514 that service manager 512 maintains.

In one example of the invention, service store 502 keeps the class and other files corresponding to the service modules 408 accessible to the network device. Alternatively, service store 502 could be implemented as the part of the VM that stores the byte codes corresponding to the service modules resident on the device. In the alternative example, it should be further noted that the class and other files associated with the service modules may be accessed by the VM with a path to a directory structure on application server 204 using a URL and a HTTP server, for example.

Network interface 510 provides functionality for communicating with other network components such as network manager 206 and application server 204 for the downloading and execution of services 324. In one example of the invention, the network interface 510 comprises an HTTP server. Network interface 510 can also comprise a command line interface such as a Telnet interface. Some initial set of commands that can be implemented are: install (allowing a remote device to download and install a service module on the device 202, such as by specifying a URL of a JAR file corresponding to the service module); start (allowing a remote device to launch a service module for execution on device 202); stop (allowing a remote device to stop a service module executing on device 202); uninstall (allowing a remote device to uninstall a service module loaded on device 202); load (allowing a remote device to load and launch a service module on device 202); unload (allowing a remote device to stop and uninstall a service module executing on device 202); modules (allowing a remote to device to view a list of the currently installed service modules on device 202); services (allowing a remote device to view a list of the currently running services on device 202).

Service installer 506 loads the service module JAR file from the location specified (which can be local to the device 202 itself or accessed via a URL on a remote device, for example), and checks to ensure that it has a valid manifest and that it contains a service implementation. Service installer 506 calls the service module's install method to allow it to perform any special processing. The service module's dependencies are not resolved at this time. Specifically, while the service module's dependencies on another service module are unresolved, the service module cannot use any services provided by that other service module. Any attempt to do so will result in a java.lang.NoClassDefFoundError exception. Services provided by the service module are not started yet; however, objects corresponding to each of the class files in the service module are instantiated.

The result of installing a service module is a service module context. A ServiceModuleContext is an object that encapsulates the runtime representation of a service module. Most module management methods require a ServiceModuleContext as one of their arguments.

Once a service module has been installed it can be started by service launcher 508. Service launcher 508 calls the service module's start method to allow the service module to start the services that it provides. Before making this call, the service manager resolves the service module's dependencies. To do this, the service manager checks in service registry 514 that all of the services that the service module depends on (as provided in the service module's manifest) are available. If any of these services are not available, the service module generates a runtime error, which may or may not result in a report back to the requesting client. A service module can also declare a dependency on JAR files that it provides. When the service manager resolves the service module's dependencies. the contents of these JAR files are also available for use by the service module. A service module's main task when it is started is to create, start, and register its services via service manager 514. The service environment places no constraints on the interface between the service module and its services. To ensure that only the service module can create and start and stop the services it is preferable that the service's constructors and the other administration methods have package access, not public access. Once a service has been created and started it can be registered in the service registry. This makes it available for use by other service modules. The service module start method should call the service manager 512 to perform the registration.

Some services will execute to perform a dedicated task and then stop. Alternatively, a service module can also stopped by service launcher, such as by calling the service's stop method. If one of the executing service module's services has been acquired by another service module, and has not been released yet, the service manager generates a runtime exception, and the service module is not stopped. To force a service module to be stopped even if it is still in use, service launcher kills any dependent service modules, then stops this service module. The service module's main tasks when it is stopped are to discard any references to objects from other service modules, release any services that is has acquired, and to unregister any services that it has provided.

Service uninstaller 504 uninstalls a service module by relinquishing any references it has to the service module's objects and enabling the JVM to garbage collect the service module.

Service manager 512 maintains service registry 512 and manages the loading and installation of service modules by service installer 506, the execution of services via service launcher 508, and the removal of service modules by service uninstaller 504.

When a service module uses a service provided by a different service module, it creates a dependency on that service. This means that another service module providing that service must be installed and started before this service module can be started. The service environment 322 tracks which services are currently running, and checks that the dependencies declared by the service module are satisfied when it is started. The service environment also gives each service module its own name space to protect it from inadvertent name clashes. When a dependency is created, the service environment connects the name space of the service module providing the service to the dependent service module. This breaks down the insulation between the two service modules and enables the dependent service module to use classes and methods in the service. When the dependency is removed, access to the names provided in the other service module is also removed.

Figure 6:
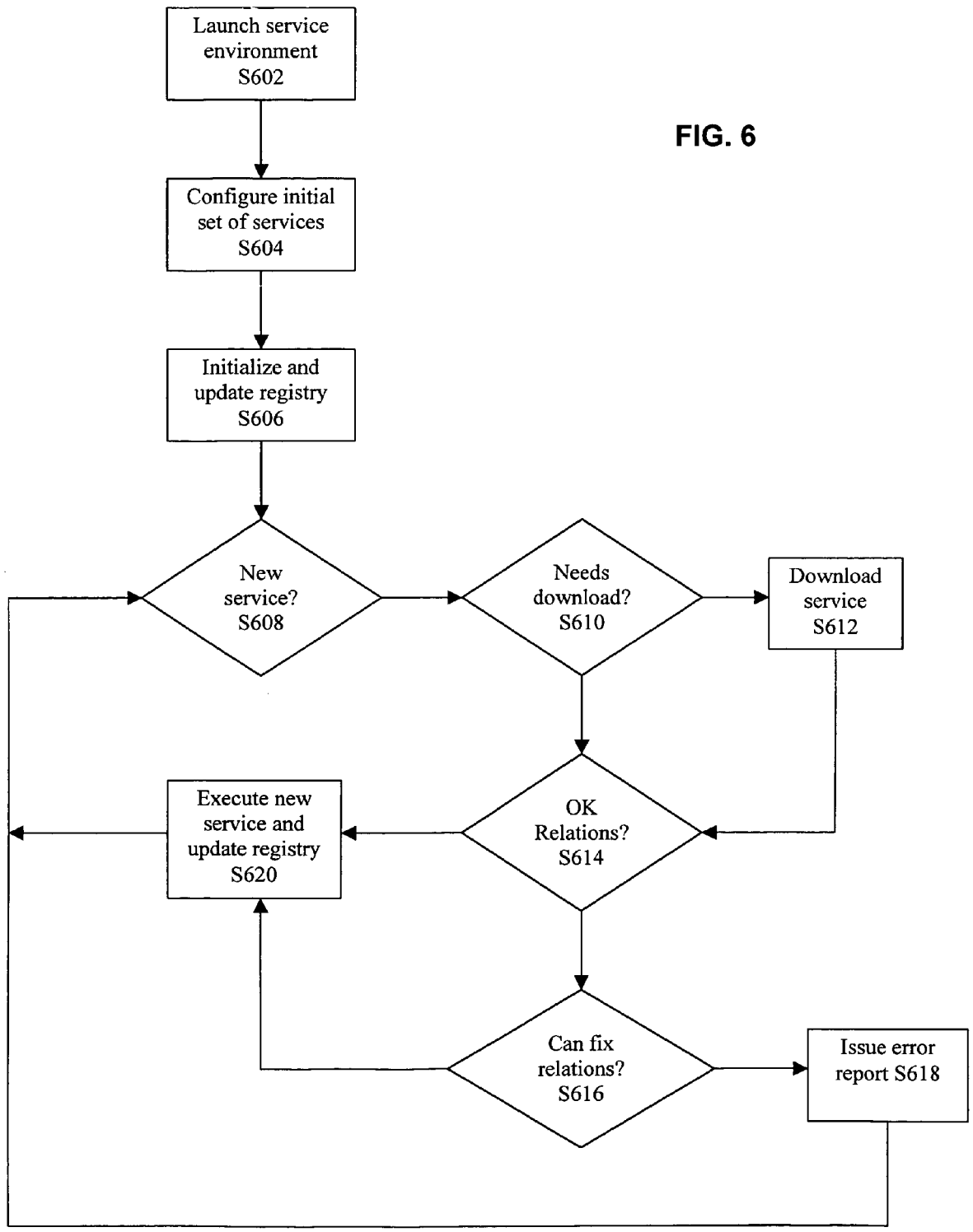
FIG. 6 is a flowchart illustrating an example of a method for locally performing a service on a network device in accordance with an embodiment of the present invention.

FIG. 6 illustrates a method of loading and managing a service for execution on a network device in accordance with an embodiment of the present invention.

As shown in FIG. 6, network device 202 (preferably at boot time) launches the service environment 322 (S602). When launched, the service environment 322 executes a start sequence that initializes the set of services operating on the device 202. The start sequence may include a list of the URLs of initial service modules that should be installed and started on the device at boot time. The URLs may specify JAR files corresponding to service modules that are located on the device 202, or they may be located on application server 204. For those URLs referring to JAR files on server 204, service environment 322 downloads the service modules encapsulated in those JAR files onto network device 202 (S604). As service modules are installed and started on the device 202, the service environment updates and maintains a service registry (S606).

When a new service is requested to be executed on the network device (S608), for example by network manager 206, service environment 324 determines whether the service exists on the device or needs to be downloaded. If it needs to be downloaded from a remote location such as server 204 (determined in block S610), the service is downloaded to device 202 (S612). Service environment 324 then determines whether all service relationships defined in the service registry 514 are satisfied for the new service (S614). If not, service environment checks whether the relationships can be resolved, for example by starting services that the new service is dependent upon (S616). If not, the service environment issues an error report (S618). Otherwise, or if service relationships are already satisfied, the new service is executed and the device registry is updated with information corresponding to the new service (S620).

Figure 7:
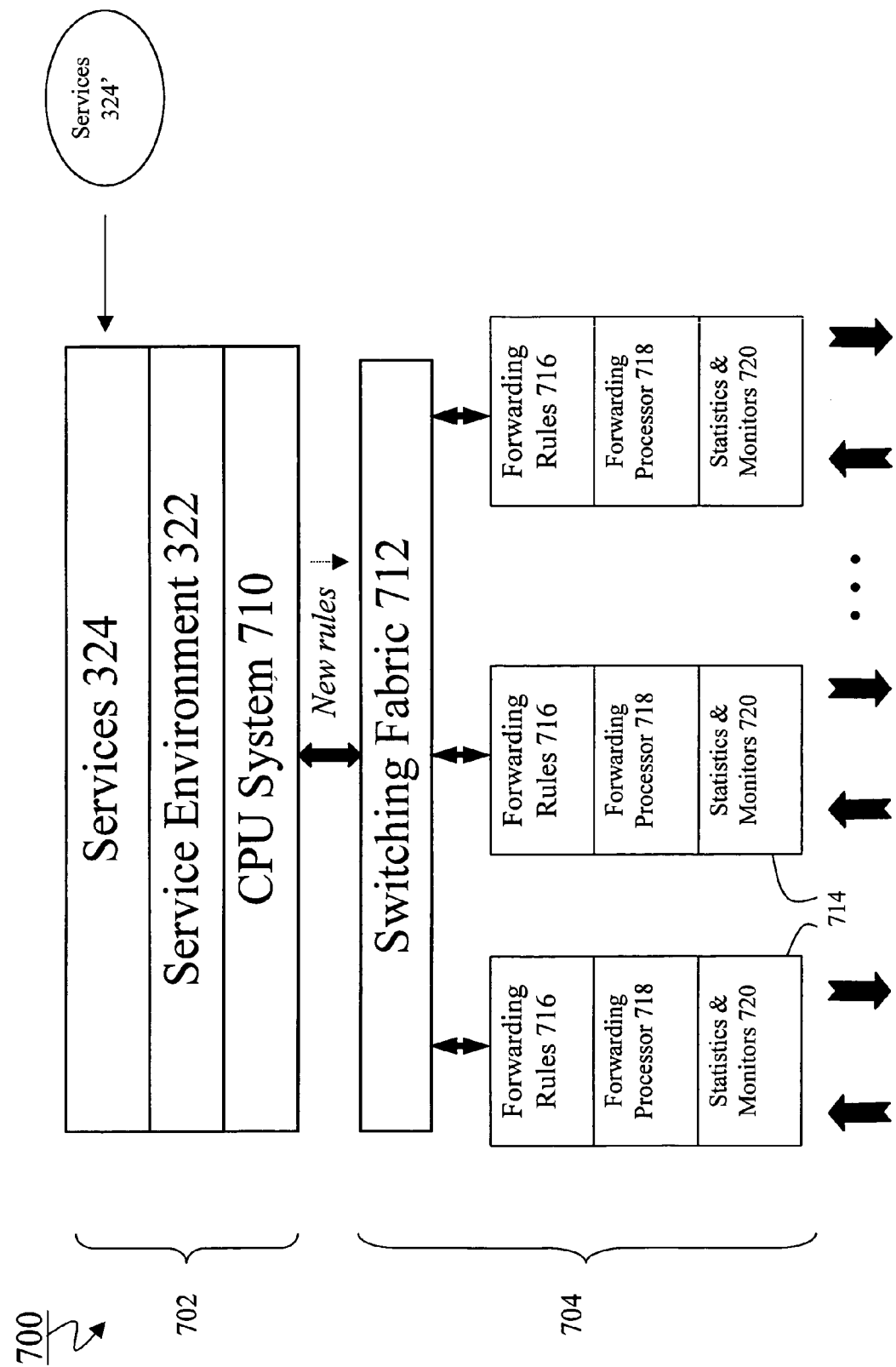
FIG. 7 is a block diagram illustrating an example of a network device in accordance with an embodiment of the present invention.

FIG. 7 illustrates an example of a network device 202 that has been adapted for dynamically loading and managing services in accordance with an embodiment of the present invention.

As shown in FIG. 7, network device 700 includes a separated control plane 702 and forwarding plane 704. Generally, packet forwarding between ports of the device is handled in the forwarding plane 704 by switching fabric 712 and switch modules 714 at wire speed, whereas control tasks can be simultaneously handled in the control plane 702 without affecting packet forwarding performance. The control plane 702 may interact with the forwarding plane 704, however, to adjust forwarding rules and retrieve statistics for example.

As further shown in FIG. 7, control plane 702 includes CPU system 710, on top of which executes service environment 322. Service environment 322 facilitates the dynamic loading, management and execution of dynamic services 324 as explained in more detail above. Dynamic services 324 enhance the performance of device 700 above and beyond that of conventional device 102.

In one example of the invention, CPU system 710, switching fabric 712 and switch modules of device 700 can be together implemented in a Nortel Accelar/Passport family of router switches. Such an implementation is preferred due to the separate control plane 702 and forwarding plane 704 of the Nortel Accelar/Passport family. However, it should be apparent that equivalent devices can be used to implement these elements of the present invention. Moreover, it should be understood that the invention is applicable to network devices that do not have a separate control plane and forwarding plane, and even to devices that do not have a packet forwarding architecture at all, and thus is not limited to the device illustrated in FIG. 7. In the Nortel Accelar/Passport implementation, switching fabric 712 and switch modules 714 are comprised of hardware integrated circuits such as ASICs. This allows packets to be forwarded between switch ports at wire speed.

Generally, packets arriving at the ports of the device 700 are processed by forwarding processor 718 of switch modules 714 in accordance with forwarding rules 716. Forwarding processor 718 also maintains statistics and monitors 720 for its associated ports. Normal network traffic is forwarded between ports by switch modules 714 through switching fabric 712. Packets addressed to the device 700 itself (such as ARP and SNMP messages, for example) are forwarded by the switch modules 714 to CPU system 710 via switching fabric 712.

As set forth in more detail above, in accordance with the present invention, service environment 322 provides an execution platform through which services 324 are performed using CPU system 710. Service environment 322 also facilitates the downloading from application server 204 and installation onto device 202 of new services 324' and manages their execution on CPU system 710. As set forth above, network manager 206 can communicate with device 700 to request device 202 to execute one or more of the services 324.

An advantage of the embodiment of the invention illustrated in FIG. 7 is the ability of services to be downloaded and managed without affect wire-speed packet forwarding performance. With the separation of the control and forwarding operations, and the provision of the services environment in the control plane, the CPU processing consumed by service environment 322 that is required to download and manage services can be performed without any impact on the normal packet forwarding operations of the device 700. Moreover, services can be downloaded that can alter the wire-speed packet forwarding operations. For example, a network manager may desire that certain types of packet flows should receive a preferred quality or class of service for a certain period of time (i.e. QOS). The network manager can then download a service 324 to the device 700 which is managed and executed by service environment 322. The downloaded service 324 can interface with APIs that interact with native device control software that causes the forwarding rules 716 in switch modules 714 to be updated in accordance with the desired QOS for the certain packet flows. The packets belonging to the identified certain flows can then be forwarded at wire-speed in accordance with the desired QOS. Many other types of dynamic services, including dynamic services that can leverage the capabilities of the separated control and forwarding plane of the present embodiment are possible.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method for performing a service on a network device, comprising the steps of:
   loading the service on the network device from another location, the service having a corresponding set of service relationships, wherein the loading includes downloading a file corresponding to the service and containing program code operable to perform the service;
   checking the service relationships of the loaded service against a stored service registry, wherein the service registry includes indications of services and indications of dependencies of services on other services, and wherein the checking the service relationships of the loaded service includes determining whether all other services the loaded service depends on are available; and
   causing the service to be executed on the network device only if all other services the loaded service depends on are determined to be available.

2. A method according to claim 1, further comprising the step of:
   updating the stored service registry with information corresponding to the executed service.

3. A method according to claim 1, wherein the step of causing the service to be executed includes the step of providing instructions corresponding to the service to a virtual machine that is ported to the network device.

4. A method according to claim 1, further comprising the step of:
   causing another service to be executed on the network device in accordance with a result of the step of checking the service relationships.

5. A method according to claim 1, wherein the network device is one of a router, a switch, and a hub.

6. A method according to claim 5, wherein the service comprises accessing a MIB on the network device.

7. A method according to claim 1, wherein the network device comprises a packet switching fabric.

8. A method according to claim 7, wherein the network device comprises a control plane and a forwarding plane including the packet switching fabric, the loading, checking and causing steps being performed in the control plane without interruption of the forwarding plane.

9. A method according to claim 8, further comprising the step of interfacing with embedded hardware and software to cause forwarding rules referred to by the packet switching fabric to be adjusted.

10. A method according to claim 7, wherein the service comprises accessing a MIB on the network device.

11. A method according to claim 1, further comprising the step of:
    communicating with a remote client to receive an identifier corresponding to the service to be performed.

12. A method according to claim 11, wherein the another location corresponds to an application server that stores a plurality of services, and wherein the identifier comprises a URL pointing to the application server.

13. A method according to claim 12, wherein the step of loading includes the step of downloading the file corresponding to the service from the application server in accordance with the URL.

14. A method according to claim 13, wherein the step of downloading includes the step of communicating with the application server using the HTTP protocol.

15. A method according to claim 1, wherein the another location corresponds to an application server that stores a plurality of services.

16. A method according to claim 11, wherein the step of communicating includes the step of providing a telnet interface that allows the remote client to provide the identifier in association with a predefined command requesting the service to be performed.

17. A method according to claim 1, further comprising the step of interfacing with embedded hardware and software to perform tasks associated with the service.

18. A network device, comprising
  means for loading a service on the network device from another location, the service having a corresponding set of service relationships, wherein the loading includes downloading a file corresponding to the service and containing program code operable to perform the service;
  means for checking the service relationships of the loaded service against a stored service registry, wherein the service registry includes indications of services and indications of dependencies of services on other services, and wherein the checking the service relationships of the loaded service includes determining whether all other services the loaded service depends on are available; and
  means for causing the service to be executed on the network device only if all other services the loaded service depends on are determined to be available.

19. A network device according to claim 18, further comprising:
  means for updating the stored service registry with information corresponding to the executed service.

20. A network device according to claim 18, wherein the means for causing the service to be executed includes means for providing instructions corresponding to the service to a virtual machine that is ported to the network device.

21. A network device according to claim 18, further comprising:
  means for causing another service to be executed on the network device in accordance with a result from the means for checking the service relationships.

22. A network device according to claim 18, wherein the network device is one of a router, a switch, and a hub.

23. A network device according to claim 22, wherein the service comprises accessing a MIB on the network device.

24. A network device according to claim 18, wherein the network device comprises a packet switching fabric.

25. A network device according to claim 24, wherein the network device comprises a control plane and a forwarding plane including the packet switching fabric, the means for loading, means for checking and means for causing being operable in the control plane without interruption of the forwarding plane.

26. A network device according to claim 25, further comprising means for interfacing with native hardware and software to cause forwarding rules referred to by the packet switching fabric to be adjusted.

27. A network device according to claim 24, wherein the service comprises accessing a MIB on the network device.

28. A network device according to claim 18, further comprising:
  means for communicating with a remote client to receive an identifier corresponding to the service to be performed.

29. A network device according to claim 28, wherein the another location corresponds to an application server that stores a plurality of services, and wherein the identifier comprises a URL pointing to the application server.

30. A network device according to claim 29, wherein the means for loading includes means for downloading the file corresponding to the service from the application server in accordance with the URL.

31. A network device according to claim 30, wherein the mean for downloading includes means for communicating with the application server using the HTTP protocol.

32. A network device according to claim 28, wherein the means for communicating includes means for providing a telnet interface that allows the remote client to provide the identifier in association with a predefined command requesting the service to be performed.

33. A network device according to claim 18, wherein the another location corresponds to an application server that stores a plurality of services.

34. A network device according to claim 18, further comprising means for interfacing with native hardware and software to perform tasks associated with the service.

35. A network device for locally performing a service, comprising:
  a network interface adapted to load the service on the network device from another location, by downloading a file corresponding to the service and containing program code operable to perform the service, the service having a corresponding set of service relationships;
  a service registry, wherein the service registry includes indications of services and indications of dependencies of services on other services;
  a service manager coupled to the network interface and the service registry that is adapted to check the service relationships of the loaded service against the service registry, wherein the checking the service relationships of the loaded service includes determining whether all other services the loaded service depends on are available; and
  a service launcher coupled to the service manager that is adapted to cause the service to be executed on the network device only if all other services the loaded service depends on are determined to be available.

36. A network device according to claim 35, wherein the network device is one of a router, a switch, and a hub.

37. A network device according to claim 35, further comprising a packet switching fabric.

38. A network device according to claim 37, further comprising:
  a control plane including the network interface, the service registry, the service manager and the service launcher; and
  a forwarding plane including the packet switching fabric, the network interface, the service manager and the service launcher being operable in the control plane without interruption of the forwarding plane.

39. A network device according to claim 38, further comprising API extensions through which the service interfaces with native hardware and software to cause forwarding rules referred to by the packet switching fabric to be adjusted.

40. A network device according to claim 35, wherein the network interface is further adapted to communicate with a remote client to receive an identifier corresponding to the service to be performed.

41. A network device according to claim 40, wherein the network interface includes a telnet interface that allows the remote client to provide the identifier in association with a predefined command requesting the service to be performed.

42. A network device according to claim 35, further comprising API extensions through which the service interfaces with native hardware and software to perform tasks associated with the service.

43. A network device for locally performing a service, comprising:

a control plane including:

an embedded CPU and operating system, a service environment ported to the embedded CPU and operating system, the service environment having:

a network interface adapted to load the service on the network device from another location, by downloading a file corresponding to the service and containing program code operable to perform the service, the service having a corresponding set of service relationships, a service registry, wherein the service registry includes indications of services and indications of dependencies of services on other services, a service manager coupled to the network interface and the service registry that is adapted to check the service relationships of the loaded service against the service registry, wherein the checking the checking the service relationships of the loaded service includes determining whether all other services the loaded service depends on are available, and a service launcher coupled to the service manager that is adapted to cause the service to be executed on the network device only if all other services the loaded service depends on are determined to be available, and a forwarding plane including a packet switching fabric, the service environment being operable in the control plane without interruption of the forwarding plane.

44. A method for updating one of a plurality of functionalities of a network device, comprising the steps of:

providing a service environment that executes in a runtime environment of the network device;

providing code corresponding to the updated one of the functionalities to the service environment from another location on a network coupled to the network device by downloading a file corresponding to the service and containing program code operable to perform the service;

providing header information indicating relationships required by the updated one of the functionalities to the service environment;

checking the relationships required by the updated one of the functionalities against a stored service registry, wherein the service registry includes indications of services and indications of dependencies of services on other services, wherein the checking the relationships required by the updated one of the functionalities includes determining whether all services required by the updated one of the functionalities are available; and executing the code corresponding to the updated one of the functionalities only if all other services required by the updated one of the functionalities are determined to be available.

* * * * *